(12) United States Patent
Romeres et al.

(10) Patent No.: US 11,389,957 B2
(45) Date of Patent: Jul. 19, 2022

(54) SYSTEM AND DESIGN OF DERIVATIVE-FREE MODEL LEARNING FOR ROBOTIC SYSTEMS

(71) Applicant: Mitsubishi Electric Research Laboratories, Inc., Cambridge, MA (US)

(72) Inventors: Diego Romeres, Boston, MA (US); Alberto Dalla Libera, Veneto (IT); Devesh Jha, Cambridge, MA (US); Daniel Nikolaev Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 410 days.

(21) Appl. No.: 16/587,490

(22) Filed: Sep. 30, 2019

(65) Prior Publication Data
US 2021/0094174 A1 Apr. 1, 2021

(51) Int. Cl.
*B25J 9/16* (2006.01)
*G05B 13/02* (2006.01)

(52) U.S. Cl.
CPC .......... *B25J 9/163* (2013.01); *G05B 13/0265* (2013.01)

(58) Field of Classification Search
None
See application file for complete search history.

(56) References Cited

U.S. PATENT DOCUMENTS

| | | |
|---|---|---|
| 9,889,566 B2 | 2/2018 | Tan et al. |
| 2018/0257225 A1 | 9/2018 | Satou |
| 2018/0276501 A1 | 9/2018 | Yamada et al. |
| 2018/0370027 A1 | 12/2018 | Oota et al. |
| 2019/0232488 A1 | 8/2019 | Levine et al. |
| 2020/0057416 A1* | 2/2020 | Matsubara ............ G06N 3/006 |
| 2020/0164506 A1* | 5/2020 | Hallock .............. B25J 15/0683 |
| 2020/0223065 A1* | 7/2020 | Hane ..................... B25J 9/1633 |

* cited by examiner

*Primary Examiner* — Paul B Yanchus, III
(74) *Attorney, Agent, or Firm* — Gennadiy Vinokur; Hironori Tsukamoto

(57) ABSTRACT

A manipulator learning-control apparatus for controlling a manipulating system that includes an interface configured to receive manipulator state signals of the manipulating system and object state signals with respect to an object to be manipulated by the manipulating system in a workspace, wherein the object state signals are detected by at least one object detector, an output interface configured to transmit initial and updated policy programs to the manipulating system, a memory to store computer-executable programs including a data preprocess program, object state history data, manipulator state history data, a Derivative-Free Semi-parametric Gaussian Process (DF-SPGP) kernel learning program, a Derivative-Free Semi-parametric Gaussian Process (DF-SPGP) model learning program, an update-policy program and an initial policy program, and a processor, in connection with the memory, configured to transmit the initial policy program to the manipulating system for initiating a learning process that operates the manipulator system manipulating the object while a preset period of time.

22 Claims, 12 Drawing Sheets

SYSTEM AND DESIGN OF DERIVATIVE-FREE MODEL LEARNING FOR ROBOTIC SYSTEMS

FIELD OF THE INVENTION

The present invention relates generally to a system and design of a derivative-free model learning technology, and more specifically to a system and design of derivative-free model learning technology for robot manipulator systems.

BACKGROUND OF THE INVENTION

A new wave of machine learning technologies including deep learning, transfer learning and reinforcement learning allow intelligent systems such as robots and personal assistants to acquire knowledge and solve difficult problems by learning from examples or instruction, without slow, tailor-made and expensive programming by humans.

The difficulty of learning models to control robotic systems lies in the fact that the motion of a robotic system is governed by very complex physical laws, called the Rigid Body Dynamics (RBD) and only a crude representation of these physical laws is usually known. Moreover, the measurements of the physical quantities needed to compute these laws, such as position, velocity and acceleration of each component of the robot, are often partially unavailable. Indeed, usually the sensors mounted on the robotic systems measure only the position component (e.g. encoders, potentiometers, proximity sensors . . . ) while velocity and acceleration are not measured. Although, there exist sensors that measure velocity and acceleration (e.g., tachometers, Laser Surface Velocimeter, Piezoelectric sensors, Inertial Measurement Units (IMU) and accelerometers sensors) these are often not integrated in the robotic systems for constructive limitations and possibly high cost. Indeed, the lack of these sensors applies the majority of the industrial robot manipulators and while some of the new generation research robots have some sensors to measure the acceleration e.g. IMU, they typically do not have sensors to measure the velocity. Moreover, when the task involves the manipulation of a certain object it is often the case that the object is sensor-less and only external sensors can be added to measure its position on the space e.g., cameras or encoders.

Accordingly, it is desired to develop advanced AI technologies for learning semantic representations of the external world based on the available measurements and re-using them for better decision making in new robotic tasks. These representations can be used to realize a framework based on machine learning techniques that makes it possible to learn and predict the motion of a robotic system.

SUMMARY OF THE INVENTION

Reinforcement Learning (RL) has seen explosive growth in recent years. RL algorithms have been able to reach and exceed human-level performance in several benchmark problems. However, the application of RL to real physical systems (e.g., robotic systems) is still a challenge, because of the large amount of experience required and the safety risks associated with random exploration.

Describing accurately the evolution of physical systems is generally very challenging, and still an active area of research, since deriving models from first principles of physics might be very involved at some extends and could also introduce biases due to parameters uncertainties and unmodeled nonlinear effects.

On the other hand, learning a model solely from data could be prohibitively expensive, and generally suffers from insufficient generalization. Models based on Gaussian Process Regression (GPR) have received considerable attention for model learning tasks in Model-Based RL (MBRL) techniques. Indeed, GPRs allow to merge prior physical information with data-driven knowledge i.e., information inferred from analyzing the similarity between data, leading to so called semi-parametric models.

Physical laws suggest that the state of a mechanical system can be described by positions, velocities, and accelerations of its generalized coordinates. However, velocity and acceleration sensors are often not available, in particular when considering low-cost setups. For example, these sensors are not available in most of the robotic arm manipulators that are currently sold as state of the art. In such cases, velocities and accelerations are usually estimated by means of causal numerical differentiation of the position measurements, introducing a difference between the real and estimated signals. These signal distortions can be seen as an additional unknown input noise, which might compromise significantly the prediction accuracy of the learning algorithm.

Some embodiments of the present invention provide a learning framework for model-based RL algorithms that does not need measurements of velocities and accelerations. Instead of representing a system state as the collection of positions, velocities, and accelerations, we define the state as a finite past history of the position measurements to express a derivative-free state representation for the model, where the derivatives of position are not included in it. Derivative-free GPR models were already introduced for derivative-free nonparametric kernels.

Some embodiments of the present invention are based on the recognition that the derivative-free GPR models can be extended to physically inspired derivative-free (PIDF) models, providing better generalization properties, and enabling the design of semi-parametric derivative-free (SPDF) models.

Accordingly, some embodiments are based on the realization that a manipulator learning-control apparatus can be provided for controlling a manipulating system, and the manipulator learning-control apparatus includes an interface configured to receive manipulator state signals of the manipulating system and object state signals with respect to an object to be manipulated by the manipulating system in a workspace, wherein the object state signals are detected by at least one object detector; an output interface configured to transmit initial and updated policy programs to the manipulating system; a memory to store computer-executable programs including a data preprocess program, object state history data, manipulator state history data, a Derivative-Free Semi-parametric Gaussian Process (DF-SPGP) kernel learning program, a Derivative-Free Semi-parametric Gaussian Process (DF-SPGP) Model Learning program, an update-policy program and an initial policy program; and a processor, in connection with the memory, configured to transmit the initial policy program to the manipulating system for initiating a learning process that operates the manipulator system manipulating the object for a preset period of time, after that the processor updates the DF-SPGP Model learning program according to the object state history data and the manipulator state history data converted, using the data preprocess program, from sets of the manipulator state and object state signals having received in the preset period of time, wherein the processor updates the update-policy program according to the updated DF-SPGP Model learning program.

Further, another embodiment of the present invention is based on realization that a computer-implemented manipulator learning method includes steps of operating a manipulating system according to an initial policy program for a preset time period, wherein the initial policy program initiates a learning process that operates the manipulator system for manipulating the object; receiving manipulator state signals and object state signals for the preset time period; updating a DF-SPGP Model learning program according to object state history data and manipulator state history data converted from sets of the manipulator state and object state signals having received in the preset period of time; and updates an update-policy program according to the updated DF-SPGP Model learning program.

BRIEF DESCRIPTION OF THE DRAWINGS

The accompanying drawings, which are included to provide a further understanding of the invention, illustrate embodiments of the invention and together with the description serve to explain the principle of the invention.

Figure 1A:
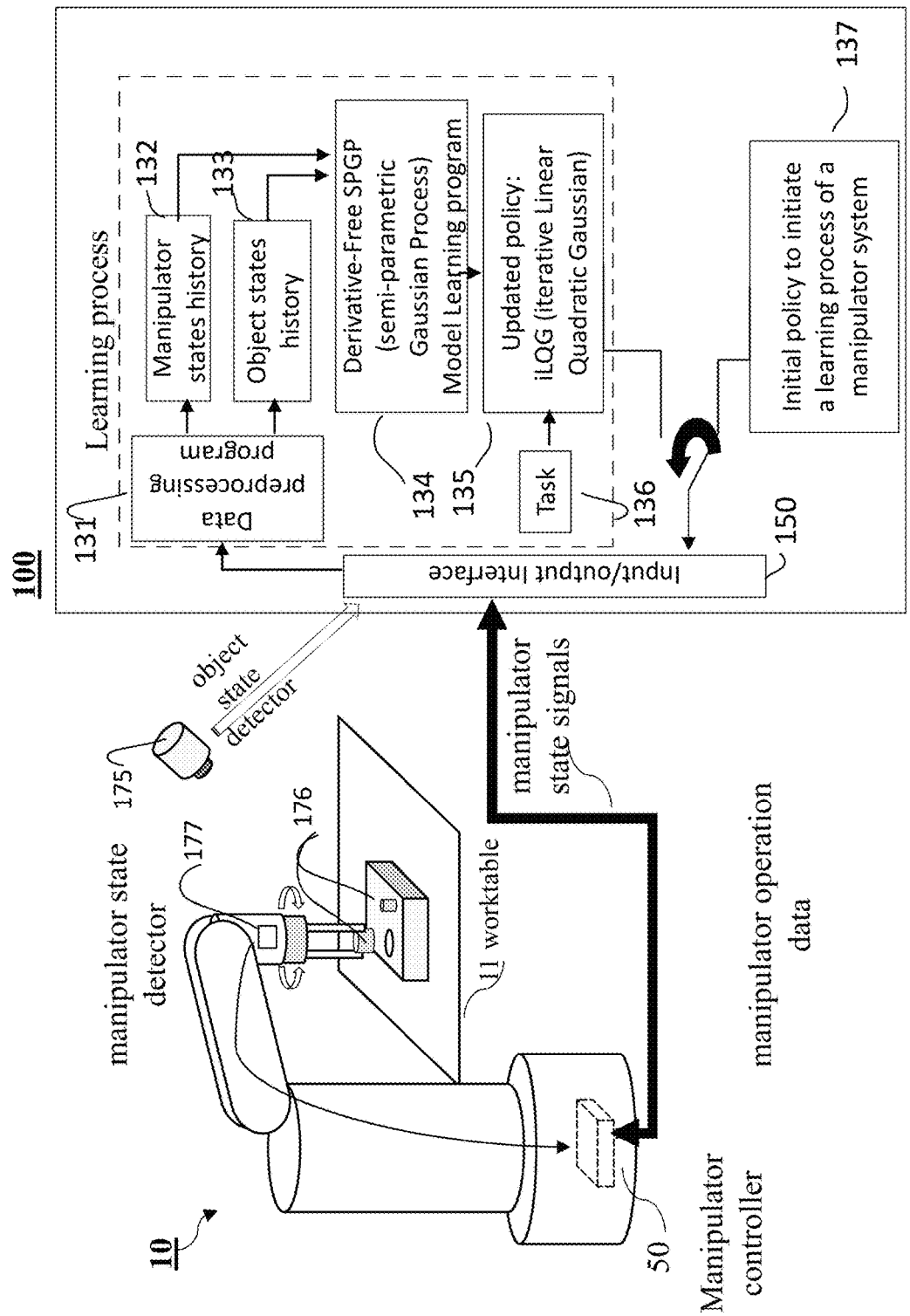
FIG. 1A is a schematic diagram illustrating a manipulator learning-control apparatus including a derivative-free model learning system connected to a robotic system, according to embodiments of the present invention.

Throughout the drawings and the detailed description, unless otherwise described, the same drawing reference numerals will be understood to refer to the same or like elements, features, and structures. The relative size and depiction of these elements may be exaggerated for clarity, illustration, and convenience.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

According to some embodiments of the present invention, there are advantages that can provide higher accuracy in prediction thanks to the conversion of the available physical knowledge into flexible data-driven machine learning methods that can adapt to describe the real physical laws. As an embodiment of the present invention only require the measurements of the positions of each component of the robotic system and not of the velocities and accelerations, the model learning system can be much simplified and reduce sufficient amount of computation loads and power consumptions.

FIG. 1A is a schematic diagram illustrating a manipulator learning-control apparatus including a derivative-free model learning system connected to a robotic system, according to embodiments of the present invention. The components 10, 50, 176 and the worktable 11 define an example of application to which the embodiment of the present invention wants to be applied.

A manipulator learning-control apparatus 100 for controlling a manipulating system may transmit to the manipulating system 10 with an interface 150 configured an initial and updated policy program using the manipulator controller 50 proper of the manipulating system 10 and may receive manipulator state signals of the manipulating system detected by at least one manipulator state detector for example the positional encoder 177 and object state signals of an object 176 to be manipulated by the manipulating system 10 in a workspace, wherein the object state signals are detected by at least one object detector for example a camera 175. These components 10, 50, 176, 175, 177 are here represented as an example but they might vary for different applications since the embodiment of the present invention is robust to different applications.

In the beginning of the learning (training) process an initial policy 137 to move the robot for a predetermined period of time is sent to the manipulating system 10 using the interface 150. The initial policy is an arbitrary signal which could be for example a sinusoidal signal, a sum of sinusoids or a random signal. During the predetermined period of time the data collected are the object state and the manipulating system state detected by 175 and 177, respectively, that the input/output interface 150 sends to the data preprocessing program 131. In 131 the data are subject to some preprocessing, then are stored in a memory as the manipulator state history 132 and as the object state history 133, these quantities at each time step contain a finite history of the past positions of the manipulator and of the object, respectively. The Derivative-free SPGP (DF-SPGP) Model learning program 134, takes as input the manipulator states history 132, the object states history 133 and the control signal of the initial policy. In performing the DF-SPGP Model learning program 134, the Derivative-free SPGP (DF-SPGP) kernel learning program (not shown) and the Derivative-free SPGP Model learning program are trained. The Derivative-free SPGP model obtained in 134 together with the task specification 136 of the task that the manipulator has to compute on the objects 176 are used to compute the updated policy in 135. In 135 the policy is the Iterative Linear Quadratic Gaussian (iLQG) but it could be replaced with any trajectory optimization technique model-based. Once the updated policy is learned in 135 this can be sent to the manipulator via the input/output interface 150 and the Manipulator controller 50. The manipulating system 10 performs now the task on the object 176.

Figure 1B:
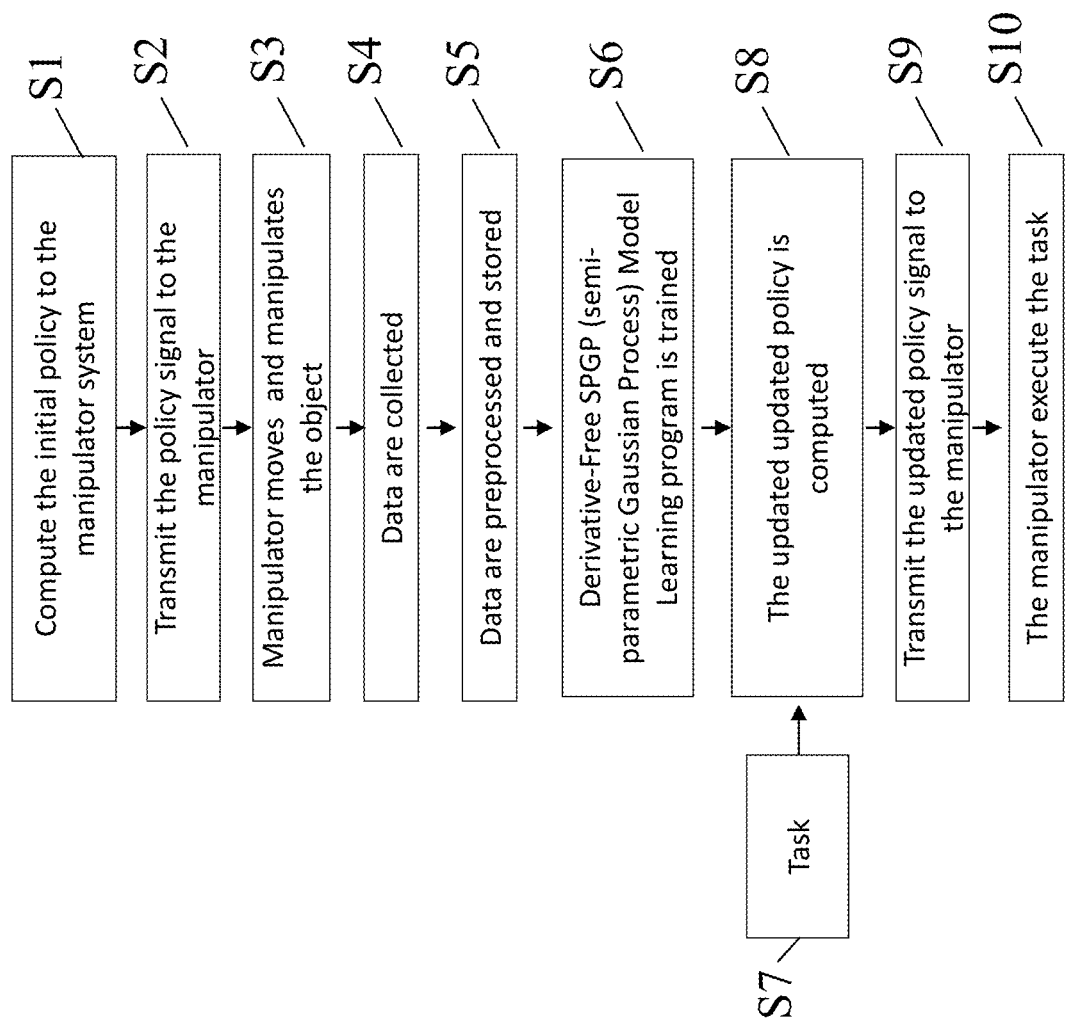
FIG. 1B shows a flowchart for describing a derivative-free model leaning process, according to embodiments of the present invention.

FIG. 1B shows a flowchart for describing a manipulator learning-control apparatus, according to embodiments of the present invention. In sequential order the embodiment of the present invention consists of defining an initial policy 137 to excite the manipulating system for a predetermined period of time and start the learning process in S1. The initial policy is then transmitted in S2 to the manipulating system using an interface 150 which sends the control signal to the manipulator controller 50 which make the manipulating system 10 move in S3 accordingly to the initial policy. The manipulating system 10 manipulates the object 176 for the predetermined period of time and the manipulator states signal and the object states signal are collected in S4 by the manipulator state-detector 177 and by the object state-detector 175 and are sent to the manipulator learning-control apparatus using the interface 150. The interface 150 transmit the data collected and the initial policy to the Data preprocessing program where the data are preprocessed in S5 and store in memory as manipulator states history 132 and object states history 133. The Derivative-free SPGP model learning program 134 is trained in S6 with these data. After that, a task 136 that the manipulating system should compute on the manipulated object 176 is defined in S7 and used together with the derivative-free SPGP model learning program to update the policy using iLQG 135 in S8. The updated policy is then transmitted to the manipulating system 10 in S9 using the interface 150 that is connected to the manipulator controller 50. The manipulating system 10 can now perform the task manipulating the object 176 accordingly to the updated policy 135 obtained using the Derivative-free SPGP model learning program 134 in S10

Figure 1C:
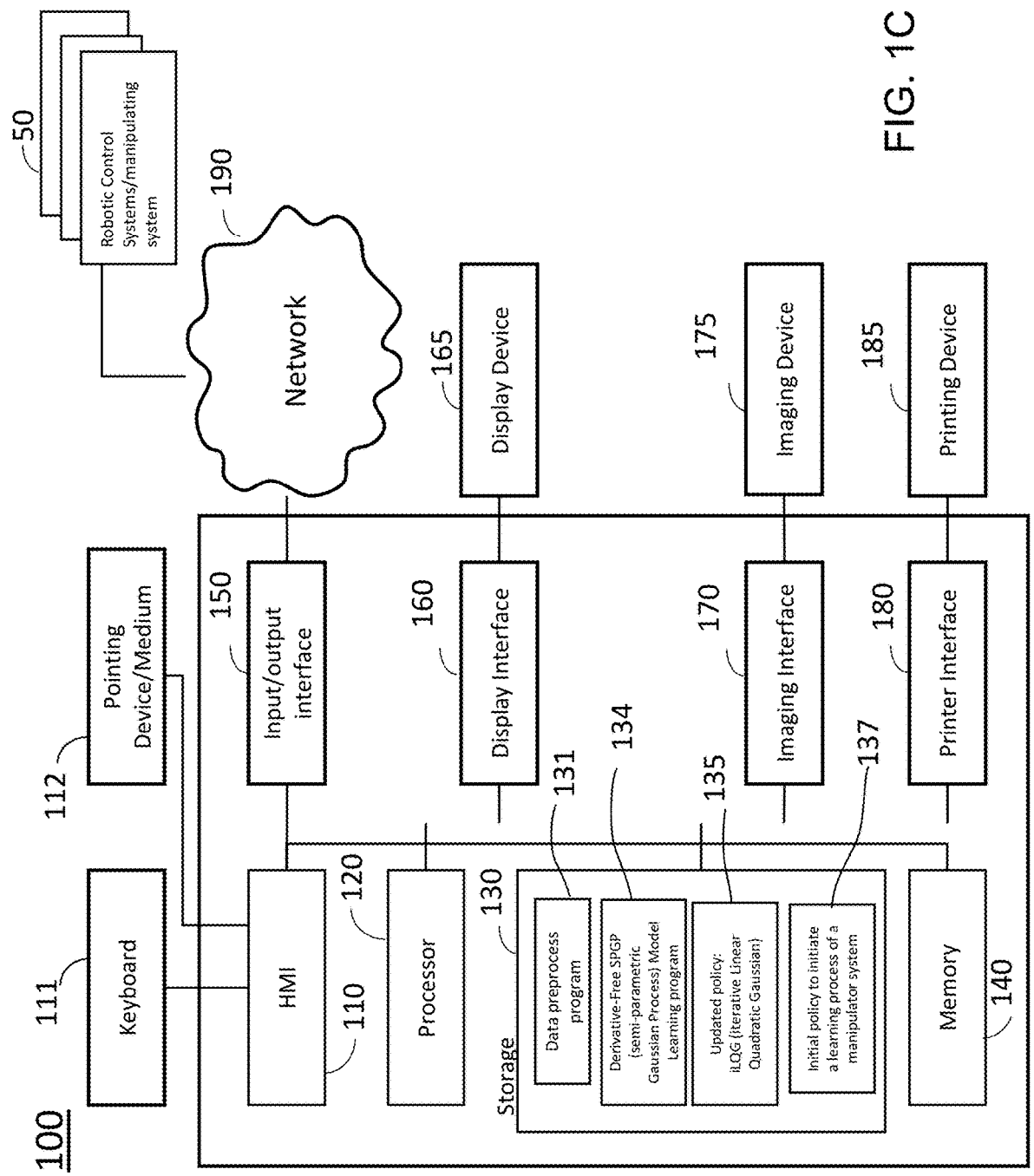
FIG. 1C is a schematic diagram illustrating a derivative-free model learning system arranged in a manipulator learning-control apparatus, according to embodiments of the present invention.

FIG. 1C is a schematic diagram illustrating a derivative-free model learning system arranged in a manipulator learning-control apparatus, according to embodiments of the present invention.

According to embodiments of the present invention, a manipulator learning-control apparatus 100 for controlling a manipulating system may include an interface 150 configured to transmit an initial and updated policy program to the manipulating system 10 and receive manipulator state signals of the manipulating system 10 and object state signals with respect to an object to be manipulated by the manipulating system 10 on a worktable 11, wherein the object state signals are detected by at least one object detector, a memory 140 to store computer-executable programs in a storage 130 including a data preprocess program 131, object state history data 133, manipulator state history data 132, a Derivative-Free Semi-parametric Gaussian Process (DF-SPGP) model learning program 134, an update-policy program 135, an initial policy program 137, a manipulator states history 132 and an object states history 133, and a processor 120 (or more than one processor), in connection with the memory. The processor 120 is configured to transmit the initial policy program 137 to the manipulating system 195 via a network 190 for initiating a learning process that operates the manipulator system manipulating the object while a preset period of time. In this case, the processor 120 updates the DF-SPGP Model learning program 134 according to the object state history data and the manipulator state history data converted, using the data preprocess program 131, from sets of the manipulator state and object state signals having received in the preset period of time, wherein the processor updates the update-policy program 135 according to the updated DF-SPGP Model learning program 134.

As examples of the derivative-free Model Learning for robotic systems, the SPDF models are applied to two example systems, a ball-and-beam platform and a Furuta pendulum, to show the derivative-free learning framework (semi-parametric derivative-free (SPDF) model) improves the estimation performance obtained by standard derivative-based models. Moreover, the SPDF model is used to solve RL-based trajectory optimization tasks in the two real systems. Some embodiments are based on recognition that the accuracy of the semi-parametric derivative-free (SPDF) models allows satisfactory control results on the physical systems even applying the control trajectory obtained by an ILQG algorithm in an open-loop fashion.

Model Based Reinforcement Learning Using Gaussian Process Regression

In this section, we describe the standard model learning framework using GPR and a trajectory optimization algorithm adopted in MBRL. An environment for RL is formally defined by a Markov Decision Process (MDP). Consider a discrete-time system $\tilde{x}_{k+1} = f(\tilde{x}_k, u_k)$ subject to the Markov property, where $\tilde{x}_k \in \mathbb{R}^{n_s}$ and $u_k \in \mathbb{R}^{n_u}$ are the state vector and the input vector at the time instant k.

When considering a mechanical system with generalized coordinates $q_k = [q_k^1, \ldots, q_k^n] \in \mathbb{R}^n$ the dynamics equations obtained through Rigid Body Dynamics, suggest that, in order to satisfy the Markov property, the state vector $\tilde{x}$ should consist of positions, velocities, and accelerations of the generalized coordinates, i.e. $\tilde{x}_k = [q_k, \dot{q}_k, \ddot{q}_k] \in \mathbb{R}^{3n}$, or possibly of a subset of these variables, depending on the task definition.

Model-based RL algorithms derive the policy $\pi(\tilde{x}_k)$ starting from $\hat{f}(\tilde{x}_k, u_k)$, an estimate of the system evolution.

Gaussian Process Regression

GPR can be used to learn $\hat{f}(\tilde{x}_k, u_k)$. Typically, the variables composing are assumed to be conditionally independent given $\tilde{x}_{k+1}$ and $u_k$, and each state dimension is modeled by a separate GPR. The components of $\hat{f}(\tilde{x}_k, u_k)$ denoted by $\hat{f}^i(\tilde{x}_k, u_k)$, with i=1 . . . n are inferred and updated based on $\{X, y^i\}$, a data set of input-output noisy observations. Let N be the number of samples available and define the set of GPR inputs as $X=[\bar{x}_1, \ldots, \bar{x}_N]$ where $\bar{x}_k=[\tilde{x}_k, u_k]\in R^m$ with $m=n_s+n_u$. As regards the outputs $y^i=[y_1^i, \ldots, y_N^i]$, two definitions have been proposed in the literature. In particular, $y_k^i$ can be defined as $\tilde{x}_{k+1}^i$, the i-th component of the state at the next time instant, or as $y_k^i=\tilde{x}_{k+1}^i-\tilde{x}_k^i$, leading to $\tilde{x}_{k+1}=\tilde{x}_k+\hat{f}(\tilde{x}_k, u_k)$. In both cases, GPR models the observations as $$y^i = \begin{bmatrix} f^i(\bar{x}_1) \\ \vdots \\ f^i(\bar{x}_N) \end{bmatrix} + \begin{bmatrix} e_1 \\ \vdots \\ e_N \end{bmatrix} = f^i(X) + e, \quad (1)$$

where e is Gaussian i.i.d. noise with zero mean and covariance $\sigma_n^2$, and $f^i(X):N(m_f^i(X),K_f^i(X, X))$. The matrix $K_f^i(X, X) \in R^{N \times N}$ is called the kernel matrix, and is defined through the kernel function $k_f^i(.,.)$, which is the kernel learning program. Under these assumptions, the posterior distribution of $f^i(\cdot)$ is Gaussian and is available in closed form. In GPR, which is the model learning program, the crucial aspect is the selection of the prior functions for $f^i(\cdot)$, defined by in $m_f^i(\cdot)$, usually considered 0, and $k_f^i(.,.)$. In the following we will refer to $f(\cdot)$ and $k(.,.)$ as one of the $f(\cdot)$ components and the relative kernel function, respectively. In the literature, when GPR is applied to modeling of physical systems, the kernel function or kernel learning program is often defined in one of the following cases.

Physically Inspired Kernels

When the physical model of the system is derived by first principles, the model information might be used to identify a feature space over which the evolution of the system is linear. More precisely, assume that the model can be written in the form $y_k=\varphi(\bar{x}_k)^T w$, where $\varphi(\bar{x}_k):R^m \to R^q$ is a known nonlinear function obtained by first principles that maps the GPR inputs vector $\bar{x}_k$ onto the physically inspired features space, and w is the vector of unknown parameters, modeled as a zero mean Gaussian random variable, i.e. $w:N(0, \Sigma_{PI})$, with $\Sigma_{PI} \in R^{q \times q}$ often chosen to be diagonal. The expression of the physically inspired kernel (PI) is a.

$$k(\bar{x}_k,\bar{x}_j)=\varphi(\bar{x}_k)^T \Sigma_{PI} \varphi(\bar{x}_j) \quad (2)$$

namely a linear kernel in the features $\varphi(\cdot)$. The efficiency of PI kernels in terms of estimation performances is closely related the adherence between the model and the behaviors of the real system. When the model is accurate these kernels exhibits good performances in terms of accuracy and generalization.

For later convenience, we define also the homogeneous polynomial kernel in $\varphi(\cdot)$, which is a more general case of (2), $$k_{poly}^P(\bar{x}_k,\bar{x}_j)=(\varphi(\bar{x}_k)^T \Sigma_{PI} \varphi(\bar{x}_j))^P. \quad (3)$$

Notice that the linear kernel is obtained when p=1. The hyperparameters to be estimated remain the diagonal elements of the matrix $\Sigma_{PI}$.

Nonparametric Kernel

When there is no known structure of the process to be modeled, the kernel has to be chosen by the user accordingly to their understanding of the process to be modeled. A common option is the Radial Basis Function kernel (RBF):

$$k_{RBF}(\bar{x}_k, \bar{x}_j) = \lambda e^{-\frac{(\bar{x}_k-\bar{x}_j)^T \Sigma_{RBF}^{-1}(\bar{x}_k-\bar{x}_j)}{2}}, \quad (4)$$

where $\lambda$ is a positive constant called the scaling factor, and $\Sigma_{RBF}$ is a positive definite matrix that defines the norm over which the distance between $\bar{x}_k$ and $\bar{x}_j$ is computed. The scaling factor and the elements of $\Sigma_{RBF}$ are unknown parameters called hyperparameters; for this reason, it is called a nonparametric (NP) kernel. Several options to parametrize $\Sigma_{RBF}$ have been proposed e.g., a diagonal matrix or a full matrix defined by the Cholesky decomposition, namely $\Sigma_{RBF}=LL^T$. In this case, the hyperparameters of $\Sigma_{RBF}$ are the elements of the lower triangular matrix L, where the elements along the diagonal are constrained to be positive. Notice that with this choice, all the positive definite matrices are parameterized.

Semiparametric Kernel

This approach combines the physically inspired and the non-parametric kernels. Here the kernel function is defined as the sum of the covariances:

$$k(\bar{x}_k,\bar{x}_j)=\varphi(\bar{x}_k)^T \Sigma_{PI} \varphi(\bar{x}_j)+k_{NP}(\bar{x}_k,\bar{x}_j). \quad (5)$$

where $k_{NP}(.,.)$ can be for example the RBF kernel (4).

The semi-parametric (SP) kernel takes advantage of the global property of the parametric kernel $k_{PI}$ as well as of the flexibility of the nonparametric kernel $k_{NP}$. Using SP kernels has been shown to have a model learning program which generalize well also to area of the state space not well explored by the data, typical behavior of model learning programs obtained with nonparametric kernels, and at the same time to have higher accuracy performance than the model learning programs obtained with parametric kernels which suffer of unmodeled dynamics.

Trajectory Optimization using iLQG

In this section, a novel learning framework to model the evolution of a physical system is proposed. Several issues need to be addressed in the standard modeling approach described above. We list here the main problems to be solved by some embodiments of the present invention.

First, the Numerical Differentiation

The Rigid Body Dynamics of any physical system computed from physical first principles are functions of joint positions, velocities and accelerations. However, a common issue is that often joint velocities and accelerations cannot be measured and computing them by means of numerical differentiation starting from the (possibly noisy) measurements of the joint positions might severely hamper the final solution. This is a very well known and often discussed problem and it is usually partially addressed by ad-hoc filter design. However, this requires significant user knowledge and experience in tuning the filters' parameters, and is still prone to introducing various errors and delays.

Second, the Conditional Independence Assumption

The assumption of conditional independence among the $f^i(\bar{x}_k)$ with $i=1 \ldots d$ given $\bar{x}_k$ in (1) might be a very imprecise approximation of the real system's behavior, in particular when the outputs considered are position, velocity or acceleration of the same variable, which are correlated by nature. This fact is both an issue for estimation performance and an issue because one separate GP for each output needs to be estimated for modeling variables intrinsically correlated, leading to redundant modeling design and testing work, and a waste of computational resources and time. This last aspect might be particularly relevant when considering systems with a considerable number of degrees of freedom.

Third, Delays and Nonlinearities in the Dynamics

Finally, physical systems often are affected by intrinsic delays and nonlinear effects that have an impact on the system over several time instants, contradicting the first-order Markov assumption; an instance of such behavior is discussed later.

Derivative-Free State definition

To overcome the aforementioned limitations, we define the system state[1] in a derivative-free fashion, considering as state elements the history of the position measurements:

$$x_k := \lfloor q_k, \ldots, q_{k-k_p} \rfloor \in R^{n(k_p+1)}. \quad (6)$$

where $k_p \in R$ is a positive integer.

The definitions of the states are described as follows. In some cases, the object state data may represent a set of sequential measurement data of positions of the object in a predetermined period of time, and the manipulator state data may represent a set of sequential measurement data of positions of the manipulator in a predetermined period of time.

The simple yet exact idea behind the definition above is that when velocities and accelerations measures are not available, if $k_p$ is chosen sufficiently large, then the history of the positions contains all the system information available at time k, leaving to the model learning algorithm the possibility of estimate the state transition function. Indeed, velocities and accelerations computed through causal numerical differentiation are the outputs of digital filters with finite impulse response (or with finite past instants knowledge for non-linear filters), which represent a statistic of the past raw position data. These statistics cannot be exact in general, and might be severely corrupted by, for example, the delay introduced when a low-pass filter is used to reject the noise, or by the compound error propagation if several filters are applied, leading to a loss of information for the learning algorithm. Instead, this loss of information is kept in the proposed derivative-free framework which is some embodiment of the present invention. The state transition function becomes deterministic and known (i.e., the identity function) for all the $\lfloor q_{k-1}, \ldots, q_{k-k_p} \rfloor$ components of the state. Consequently, the problem of learning the evolution of the system is restricted to learning only the functions $q_{k+1}=f(x_k, u_k)$ reducing the number of models to learn and avoiding erroneous conditional independence assumptions. Finally, the MDP has a state information rich enough to be robust to intrinsic delays and to obey the first-order Markov property.

State Transition Learning with PIDF Kernel

The proposed state definition entails the need of a modeling technique for the MDP's state transition function. Derivative-free GPRs were already introduced only for nonparametric derivative-free GPR. However, as pointed in the above, the generalization performance of data-driven models might not be sufficient to guarantee robust learning performance, and exploiting eventual prior information coining from the physical model is crucial. On the other hand, physical models depend on positions, velocities and accelerations, and their use in a derivative-free framework is not possible in the standard formulation, the embodiments of the present invention solve this issue. In the following the procedure to obtain the so called Physically Inspired Derivative-Free (PIDF) kernel is proposed.

Define $q_k^j := \lfloor q_k^i, \ldots, q_{k-k_p}^i \rfloor$ and assume that a physical model of the type $y_k = \varphi(q_k, \dot{q}_k, \ddot{q}_k, u_k)^w$, is known. Then, we propose a set of guidelines based on $\varphi(q_k, \dot{q}_k, \ddot{q}_k, u_k)$ to derive a PIDF kernel, which is an important component of the DFSPGP model learning program.

PIDF Kernel Guidelines

Each and every position, velocity or acceleration term in $\varphi(\cdot)$ is replaced by a distinct polynomial kernel $k_{poly}^P(.,.)$ of degree p, where p is the degree of the original term; e.g., $\ddot{q}^i \rightarrow k_{poly}^2(.,.)$.

The input of each of the kernels $k_{poly}^P(.,.)$ in 1) is a function of $q_k^i$-, the history of the position $q^i$ corresponding to the independent variable of the substituted term; e.g., $\ddot{q}^i \rightarrow k_{poly}^2(q_k^i-,.)$.

If a state variable appears into $\varphi(\cdot)$ transformed by a function $g(\cdot)$, the input to $k_{poly}^P(.,.)$ becomes the input defined at point 2) transformed by the same function $g(\cdot)$, e.g., $\sin(q^i) \rightarrow k_{poly}^1(\sin(q_k^j-), \sin(q_j^i \mathbf{0}.))$.

Applying this guidelines will generate a kernel function $k_{PIDF}(.,.)$ which incorporate the information given by the physics without knowing velocity and acceleration.

The extension to semi-parametric derivative-free (SPDF) kernels become trivial when combing, as described in section "Semiparametric kernel", the proposed $k_{PIDF}(x_k,.)$ with a NP kernel with derivative-free state, $k_{NPDF}(x_k,.)$:

$$k_{SPDF}(x_k, x_j) = k_{PIDF}(x_k, x_j) + k_{NPDF}(x_k, x_j). \quad (7)$$

which is the DF-SPGP kernel learning program. These guidelines formalize the solution to the non trivial issue of modeling real systems using the physical models but without measuring velocity and acceleration. In other words, the DF-SPGP Model learning program, which is defined based on the DF-SPGP kernel learning program (the DF-SPGP kernel learning program may define the DF-SPGP Model learning program), can predict behaviors of the manipulator and/or the object manipulated by the manipulator.

In the next sections, the embodiments of the present invention described above are applied to two benchmark systems, a Ball-and-Beam (BB) and a Furuta Pendulum (FP) system, describing in details the kernel derivations. These are two examples to show some embodiment of the present invention. However, the embodiments of the present invention are not restricted to these examples.

For both the setup we will show the task of controlling the system, using the updated policy, highlighting the advantages due to the adoption of derivative-free framework. In this case, the update-policy program is transmitted to the manipulating system after the update-policy program having been updated according to the updated DF-SPGP Model learning program.

Moreover, in the BB case we will highlight the improved estimation performance of $k_{PIDF}(x_k,.)$ over $k_{PI}(\tilde{x}_k,.)$ computing $\tilde{x}_k$ with several filters to obtain the velocities signal and we will show the problems of choosing the most suitable velocity that standard algorithms have to deal with, as opposed to some embodiments of the present invention. In the more complex FP system we will analyze the robustness to delays, the prediction performance at k-steps ahead and make extensive comparisons among physical inspired, non-parametric, semi-parametric derivative-free and standard GPR.

Ball-and-Beam Platform

Figure 2A:
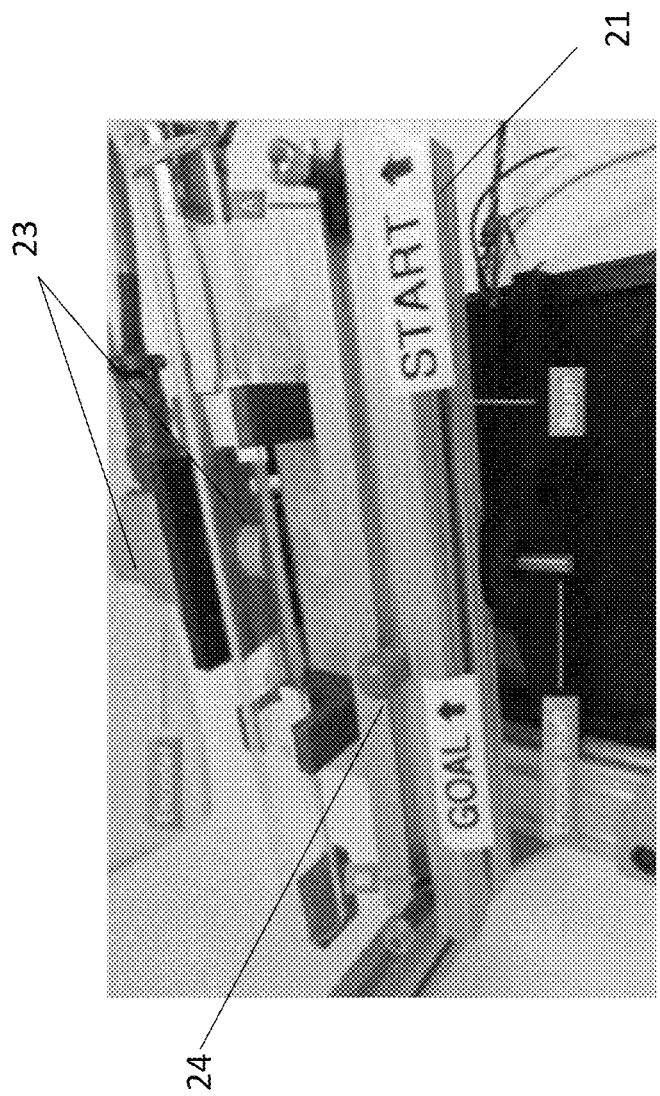
FIG. 2A shows an example of a Ball-and-Beam experimental setup, according to embodiments of the present invention.

FIG. 2A shows our experimental setup for the BB system an example of manipulator system. An aluminum bar is attached to a tip-tilt table 21 (platform) constrained to have 1 degree of freedom (DoF). The platform is actuated by a servo motor (not shown), e.g. an off-the-shelf HiTec type HS-805BB RC model PWM-controlled servo motor, which provides open-loop positioning; the platform angle is measured by an accurate absolute encoder 23. In some cases, the manipulator state signals are detected by state-detectors arranged at moving portions of the manipulating system.

The manipulator state signals may also be signals from actuators of the manipulating system, or encoders of the manipulating system, or combination of the signals from the actuators and the encoders. Further, the state-detectors may be positioning sensors, encoders, or combination of the positioning sensors and the encoders. Further, the state-detectors may be arranged at moving portions of the manipulating system or at non-moving portions of the manipulating system, or arranged at both the moving portions and the non-moving portions of the manipulating system. There is no tachometer attached to the axis, so angular velocity is not directly measurable. A ball 24 which is the object to be manipulated by the manipulating systems is rolling freely in the groove. In this case, an RGB camera may be attached to a fixed frame to measure the ball's position. In some cases, at least one object detector may be an RGBD camera generating the object state signals.

Further, the camera can be the object state detector which is separated from the manipulating system. The ball is tracked in real-time using a simple, yet fast, blob tracking algorithm on the images collected by the camera. All the communication with the camera and servo motors driving the system is done using the Robot Operating System (ROS).

Let θ and p be the beam angle and the ball position, respectively, considered in a reference frame with origin in the beam center and oriented s.t. the A beam end is positive. The ball forward dynamics is expressed by the following equation:

$$\ddot{p} = (mp\dot{\theta}^2 - mg\sin(\theta) - b\dot{p})/(J_b/r^2 + m) = \lfloor(p - l/2)\dot{\theta}^2, \sin(\theta), \dot{p}\rfloor w = \varphi(\theta, \dot{\theta})^T w, \quad (8)$$

where m, $J_b$, r and b are the ball mass, inertia, radius, and friction coefficient, respectively. Starting from eq. (8), the forward function for $\Delta_{p_k} = p_{k+1} - p_k$ is derived by integrating $\ddot{p}$ twice forward in time, and assuming a constant $\ddot{p}$ between two time instants:

$$\Delta_{p_{k+1}} = \dot{p}_k \delta_t + \frac{\delta_t^2}{2}\varphi(\theta, \dot{\theta}, p, \dot{p})^T w = \varphi(\theta, \dot{\theta}, p, \dot{p})^T w', \quad (9)$$

where $\delta_t$ is the sampling time. In order to describe the BB system in the framework proposed in Section "Derivative-free state definition" we define the derivative-free state $x_k = \lfloor x^p k, x^\theta k \rfloor$, with $$x^p k = \lfloor p_k, \ldots, p_{k-k_p}\rfloor, x^\theta k = \lfloor \theta_k, \ldots, \theta_{k-k_p}\rfloor$$

In this case, the object state data represent a set of sequential measurement data of positions of the object in a predetermined period of time, and the manipulator state data represent a set of sequential measurement data of positions of the manipulator in a predetermined period of time.

Applying the guidelines defined in section "PIDF Kernel guidelines" to Equation (9), the PIDF kernel obtained is $$k_{PIDF}^{BB}(x_k, x_j) = k_{poly}^1(x^p k, x^p j)k_{poly}^2(x^\theta k, x^\theta j) + k_{poly}(\sin(x^\theta k), \sin(x^\theta j)) + k_{poly}^1(x^p k, x^p j). \quad (10)$$

Prediction Performance

The purpose of this section is to compare the prediction performance of the GP models using as prior the PIDF kernel (10), denominated as $f_{PI_{DF}}(x)$, and using the standard PI kernel applying (8) to Equation (2), denominated as $f_{PI}(\tilde{x})$. The question that the standard approach imposes is how to compute the velocities from the measurements in order to estimate $\tilde{x}$, and there is not a unique answer to this question. We experimented with some common filters using different gains in order to find good velocity approximations:

Standard numerical differentiation followed by a low pass filter to reject numerical noise. We considered 3 different cutoff 15, 21, 28 Hz with correspondent estimators denominated as $f_{PI_{n1}}$, $f_{PI_{n2}}$, $f_{PI_{n3}}$, respectively;

Kalman filter, with different process covariances $\Sigma_x$=diag([$\sigma_x$, $2\sigma_x$]) and $\sigma_x$ equals to 0.005, 0.5, 10 with correspondent estimators $f_{PI_{KF1}}$, $f_{PI_{KF2}}$, $f_{PI_{KF3}}$;

The acausal Savitzky-Golay filter $f_{PI_{SG}}$ with window length 5.

A causal filters have been introduced just to provide an upper bound on prediction performance; otherwise, they cannot be applied in real-time applications. As regards the number of past time instants considered in $f_{PI_{DF}}$, we set $k_p$=4. Data collection consisted of 3 minutes of operation on the BB system with state collected, with control actions applied at 30 Hz and measurements from the encoder and camera were recorded. The control actions were generated as a sum of 10 sines waves with random sampled frequency between [0,10] Hz, shift phases in [0,$2\pi$] and amplitude less than 5 degrees.

Figure 2B:
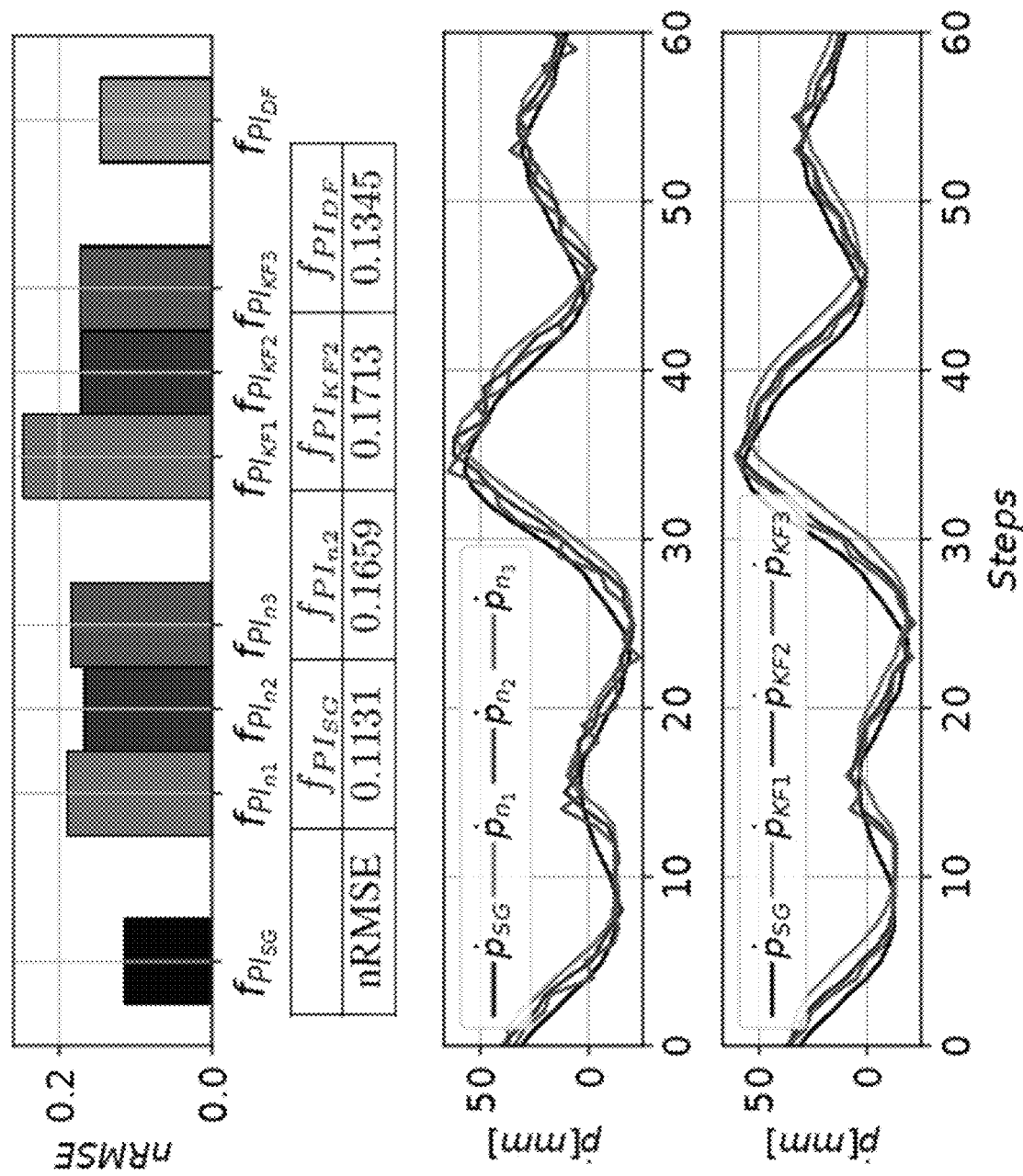
FIG. 2B shows a comparison of the normalized Root Mean Squared Error (nRMSE) obtained in test data with several standard physically inspired estimators and with the estimator, $fPI_{DF}$, obtained accordingly to some embodiments of the present invention.

FIG. 2B shows, on the top plot and on the table, a comparison of the normalized Root Mean Squared Error (nRMSE) obtained in test data with several standard physically inspired estimators and with the estimator, $f_{PI_{DF}}$, obtained accordingly to some embodiments of the present invention. The nRMSE is a standard error metric and the model $f_{PI_{DF}}$ obtained with the embodiments of the present invention has lower nRMSE error than the other standard models. Only $f_{PISG}$ performs better, but that is an oracle that cannot be implemented in reality and it is added to the graph as a benchmark. In the two lower plots, we present detailed evolutions of $\dot{p}$ computed by means of numerical differentiation and a Kalman filter which are standard methods. These plots show how with state-of-the-art numerical differentiation techniques there is not a unique way to determine the velocity $\dot{p}$ and therefore the importance of the embodiments of the present invention which uses only the position past history and not the velocity.

In FIG. 2B, on the top plot, we show the $n_{RMSE}$ comparison of the $n_{RMSE}$ computed on test data, obtained with physically inspired estimators. On the lower plots, we show a detailed plot of the evolution of $\dot{p}$ computed by means of numerical differentiation and a Kalman filter.

The model obtained with acausal filtering $f_{PI_{SF}}$ is shown as a benchmark since it is physically impossible to implement it at run time on the manipulator and it guarantees the best performance. Among the estimators with causal inputs, the proposed approach $f_{PI_{DF}}$ performs best, confirming the validity of derivative-free estimators. The table in FIG. 2B shows the numerical values of the nRMSE for the different models.

Results obtained with numerical differentiation and Kalman filtering suggest that the technique used to compute velocities can affect prediction performance significantly. In FIG. 2B, we present also a detailed plot of the $\dot{p}$ evolution obtained with different differentiation techniques. As expected, there is a certain delay between these signals and $\dot{p}$ computed with an acausal filter. The $n_{RMSE}$ values prove the delay affects prediction performance significantly. Consequently, the cutoff frequencies and the process covariances must be tuned in a suitable way, minimizing the delay. For instance, increasing the cutoff frequency decreases the delay, but at the same time impairs the rejection of noise. An inspection of the $f_{PI_{n1}}$, $f_{PI_{n2}}$ and $f_{PI_{n3}}$ $n_{RMSE}$ values shows that too high or too low cutoff frequencies lead to the worst prediction performance. With our proposed approach, tuning is not required, since the optimal filtering coefficients are learned automatically during GPR training.

Ball-and-Beam Control

The control task in this system is the stabilization of the ball with null velocity in a target position along the beam. The control trajectory is computed using the iLQG algorithm introduced earlier which gives the updated-policy and the model is computed with the DF-SPGP Model learning program which is a GP with semiparametric kernel of the form in Eq.(7):

$$k_{SPDF}^{BB}(x_i,x_j)=k_{PIDF}^{BB}(x_i,x_j)+k_{NPDF}^{BB}(x_i,x_j). \quad (11)$$

where the NP kernel is s $k_{NPDF}^{BB}(x_i, x_j)=k_{RBF}(x_i, x_j)$ with the $\Sigma_{RBF}$ matrix parametrized through Cholesky decomposition. The training data are the same described in the following. This is an DF-SPGP model learning program for the Ball-and-beam manipulating system. In this case, the DF-SPGP Model learning program predicts behaviors of the manipulator and/or the object manipulated by the manipulator. The obtained control trajectory is then applied to the physical system and the performance can be seen in FIGS. 3A and 3B.

Figures 3A, 3B:
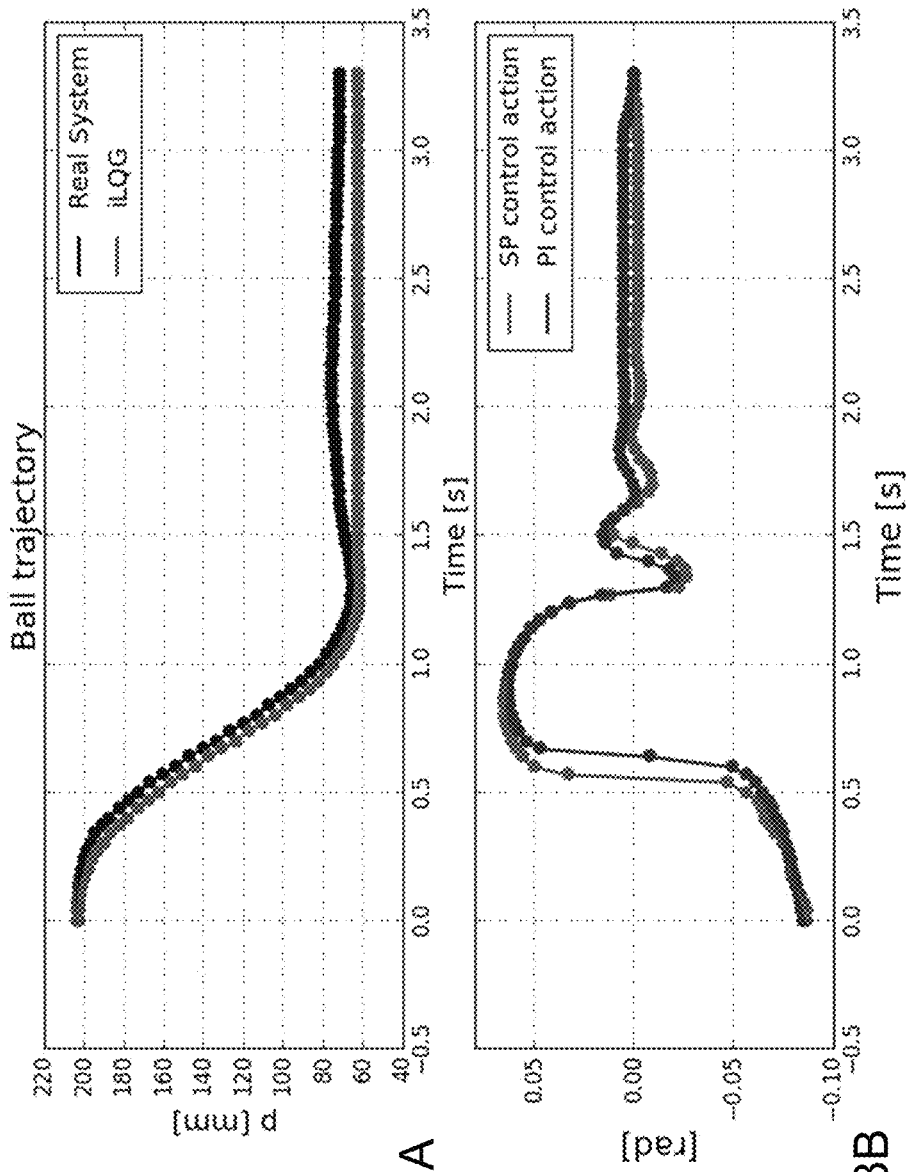
FIG. 3A shows a comparison of the evolution of the position of the ball while controlling the Ball and Beam system with the iLQG policy both on the real system and on the derivative-free SPGP model, according to some embodiments of the present invention.
FIG. 3B shows the difference between the control actions obtained with the updated iLQG policy using the derivative-free SPGP model learning program and the derivative-free PIGP model learning program, according to some embodiments of the present invention.

FIG. 3A shows a comparison of the evolution of the position of the ball while controlling the Ball and Beam system with the iLQG policy both on the real system and on the derivative-free SPGP model. The strong similarity between the two signals shows the accuracy of the embodiment of the present invention.

In the top plot FIG. 3A, we can observe how the optimized trajectory for the model remains tight to the ball trajectory of the real system for all the 100 steps (3.3[s]), which is the chosen length for the ILQG trajectory. This result, represents the high accuracy of the model in estimating the evolution of the real system. Notice that the control trajectory is implemented in open loop to highlight the model precision obtaining an average deviation between the target and the final ball position of 9 [mm] and standard deviation of 5 [mm] in 10 runs. Adding a small proportional feedback the error becomes almost null. In the bottom plot FIG. 3B, the control trajectory obtained using both $k_{SPDF}^{BB}$(.,.) and $k_{PIDF}^{BB}$(.,.) kernels is shown. Two major observations emerge: the trajectory obtained with $k_{SPDF}^{BB}$(.,.) approximate a bang-bang trajectory that in a linear system would be the optimal trajectory, and the trajectory obtained with $k_{PIDF}^{BB}$(.,.) is similar but since the equation of motions cannot describe all the nonlinear effect proper of a real system, the control action has a final bias that makes the ball drift away from the target position.

This analysis concludes an example of manipulator learning-control apparatus. In some cases, the object state data represent a set of sequential measurement data of positions of the object in a predetermined period of time.

The successes/effects obtained shows some of the benefits of some embodiments of the present invention.

Furuta Pendulum: Derivative Free Modeling and Control

Another embodiment related to the second physical system considered is the Furuta pendulum, as a popular benchmark system in control theory.

Figure 5:
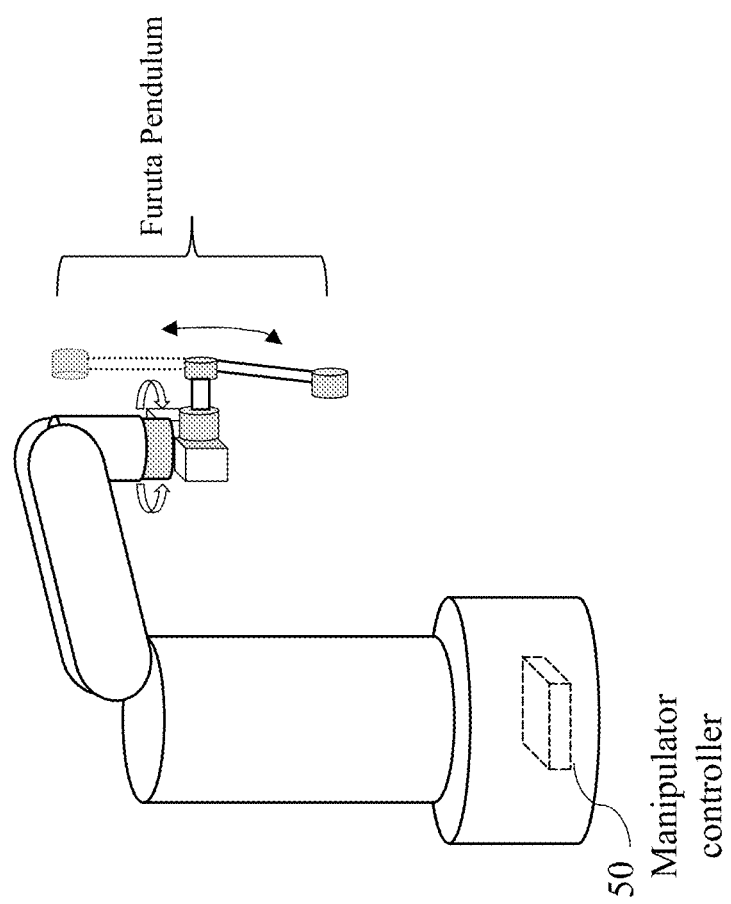
FIG. 5 shows an example setup of a Furuta Pendulum held in the wrist joint of the robot, according to some embodiments of the present invention.

FIG. 5 shows an example setup of a Furuta Pendulum held in the wrist joint of the robot, according to some embodiments of the present invention. The Furuta pendulum is a challenging system for control, as it is under-actuated and its dynamics are very non-linear. Its dynamics are characterized by highly variable cross couplings, due to the presence of Coriolis and centripetal forces.

Figure 4:
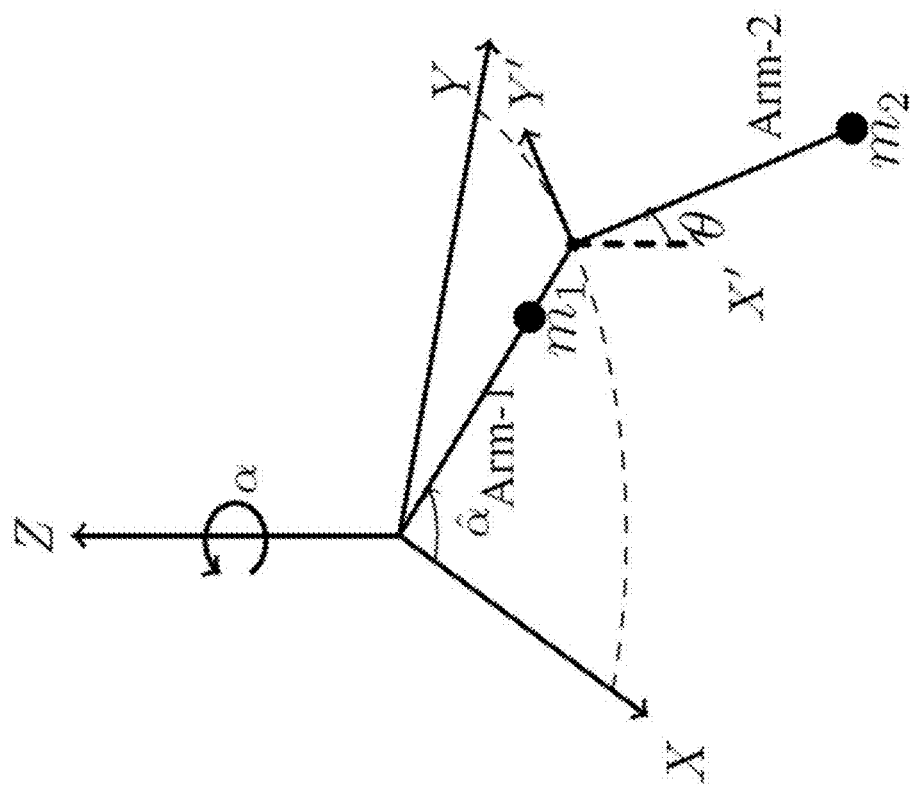
FIG. 4 shows a schematic diagram of the FP with various system parameters and state variables, according to embodiments of the present invention.

A schematic of the FP with its parameters and variables is shown in FIG. 4. We refer to "Arm-1" and "Arm-2" in FIG. 4 as the base arm and the pendulum arm, respectively, and we denote with $\hat{\alpha}$ the angles of the base arm and with $\theta$ the angles of the pendulum. The FP is an example of object that can be manipulated by a manipulating system. The angles $\hat{\alpha}$ cannot be measured while the angles $\theta$ are measured by a positional encoder sensor which is an object state detector integrated in the object itself and separated from the manipulating system.

Based on a physical model of the FP, we obtained the expression of the angular acceleration of the pendulum $\ddot{\theta}$ as a linear function w.r.t a vector of parameters w, $$\ddot{\theta} = \left(-\ddot{\hat{\alpha}}m_2L_1l_2\cos(\theta) + .5\dot{\hat{\alpha}}^2\hat{J}_2\sin(2\theta) + b_2\dot{\theta} + gm_2l_2\sin(\theta)\right)/\hat{J}_2 = \quad (10)$$

$$\left[-\ddot{\hat{\alpha}}m_2L_1l_2\cos(\theta) \; \dot{\hat{\alpha}}^2\sin(2\theta) \; \dot{\theta} \; \sin(\theta)\right]w = \varphi_{\ddot{\theta}}\left(\ddot{\hat{\alpha}}, \dot{\hat{\alpha}}, \dot{\theta}, \theta\right)^T w,$$

where $\hat{J}_1 = J_1 + m_1l_1^2 + m_2L_1^2$ and $\hat{J}_2 = J_2 + m_2l_2^2$.

The FP considered in this work has several characteristics that are different from typically studied in the research literature. Indeed, in our FP (see FIG. 5), the base arm is held by a gripper which is rotated by the wrist joint of a robotic arm, the MELFA RV-4FL, which is an example of manipulating system. For this reason, the rotation applied to the wrist joint is denoted by $\alpha$, and it is different from the actual base arm angle $\hat{\alpha}$ (see FIG. 4). The control cycle of the robot is fixed at 7.1 ms, and communication to the robot and the pendulum encoder is handled by the Robot Operating System (ROS).

These circumstances have several consequences. First, the robot can only be controlled in a position-control mode and we need to design a trajectory of set points $\alpha^{des}$ considering that the manufacturer limits the maximum angle displacement of any robot's joint in a control period. This constraint, together with the high performances of the robot controller, results in a quasi-deterministic evolution of $\alpha$, that we identified to be $\alpha_k=(\alpha_k^{des}-\alpha_{k-1}^{des}/2$. Therefore, the forward dynamics learning problem is restricted to model the pendulum arm dynamics. Additionally, the 3D-printed gripper causes a significant interplay with the FP base link, due to the presence of elasticity and backlash. These facts lead to vibrations of the base arm along with the rotational motion, and a significant delay in actuation of the pendulum arm, which results in a $\alpha \neq \hat{\alpha}$.

Delay and Nonlinear Eeffects

In order to demonstrate the presence of delays in the system dynamics of the FP, we report a simple experiment in which a triangular wave in $\alpha^{des}$ excites the system.

Figure 6:
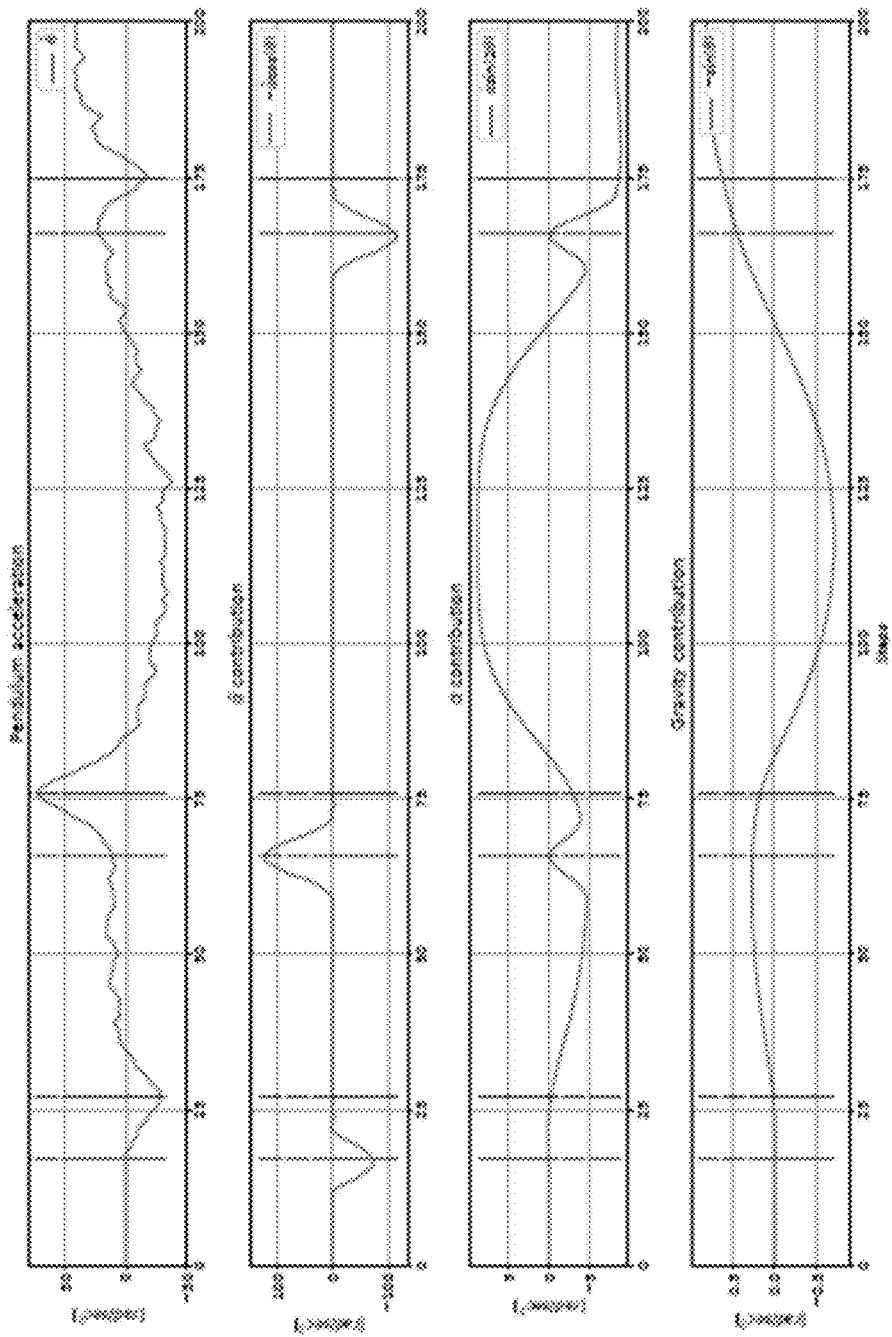
FIG. 6 shows evolution of $\ddot{\theta}$ and of its model-based basis functions, according to embodiments of the present invention.

The results are shown in FIG. 6 where we report the evolution of $\ddot{\theta}$ and its model-based basis functions, where the derivatives of $\theta$ and $\alpha$ are computed using the acausal Savitzky-Golay filter (the term depending on $\dot{\theta}$ is not reported, as the effects of viscous friction are not significant). An acausal filter is used because for offline analysis purposes it is the most accurate. The evolution of $\ddot{\theta}$ is characterized by a main low frequency component with two evident peaks in the beginning of the trajectory, and a higher frequency dynamical component which corrupts more the main component as the time passes by. Several insights can be obtained from these results. First, the peaks of the low frequency component can be caused only by the $\ddot{\alpha}$ contribution, given that the $\dot{\alpha}$ and $\theta$ contributions do not exhibit these behaviours so prominently. Second, the difference between the peaks in the $\ddot{\alpha}$ contribution and $\ddot{\theta}$ (highlighted in the figure by the vertical dashed lines) represent the delay from the control signal and the effect on the pendulum arm. Third, the high frequency component in $\ddot{\theta}$ might represent the noise generated by the vibration of the gripper, the elasticity of the base arm, and all the nonlinear effects given by the flexibility of the gripper.

Furuta Pendulum DF-SPGP Model Learning Program

We used the derivative-free framework to learn a model of the evolution of the pendulum arm. The FP state vector is defined as $x_k = [x_k^\theta, x_k^\alpha, 60_{k-1}^{des}]$, with $$x_k^\theta = [\theta_k, \ldots, \theta_{k-k_p}], x_k^\alpha = [\alpha_k, \ldots, \alpha_{k-k_p}]$$

that are the past history positions. In this case, the object state data represent a set of sequential measurement data of positions of the object in a predetermined period of time, and the manipulator state data represent a set of sequential measurement data of positions of the manipulator in a predetermined period of time. Starting from Equation (12), and following the same procedure applied in the BB application to derive Equation (9), we obtain $\Delta_{\theta_k} = \theta_{k+1} - \theta_k = \varphi_{\ddot{\theta}}$ ( $\hat{\alpha}_k, \hat{\dot{\alpha}}_k, \dot{\theta}_k, \theta_k)^T w'$. Applying the guidelines in Section "PIDF Kernel Guidelines", the expression for the corresponding derivative-free physically inspired kernel is $$k_{PIDF}^{FP}(x_i, x_j) := k_{poly}^1(x_i^\alpha, x_j^\alpha) k_{poly}^1(\cos(x_i^\theta), \cos(x_j^\theta)) + \quad (13)$$
$$k_{poly}^2(x_i^\alpha, x_j^\alpha) k_{poly}^1(\sin(2x_i^\alpha), \sin(2x_j^\alpha)) +$$
$$k_{poly}^1(\sin(x_i^\theta), \sin(x_j^\theta)) + k_{poly}^1(x_i^\theta, x_j^\theta)$$

In order to also model the complex behavior of the FP system, we define a semi-prametric kernel for the FP as:

$$k_{SPDF}^{FP}(x_i, x_j) = k_{PIDF}^{FP}(x_i, x_j) + k_{NPDF}^{FP}(x_i, x_j). \quad (14)$$

where the NP kernel is defined as the product of two RBFs with their $\Sigma_{RBF}$ matrices independently parameterized through Cholesky decomposition) $k_{NPDF}^{FP}(x_i, x_j) = k_{RBF}(x_i^\alpha, x_j^\alpha) k_{RBF}(x_i^\theta, x_j^\theta)$. Adopting a full covariance matrix, we let the RBF learn convenient transformations of the inputs, increasing the generalization ability of the predictor. Equation (14) is the DF-SPGP Kernel Learning Program for the FP system, used to compute the DF-SPGP Model Learning Program.

Before reporting numerical results on the performance of the DF-SPGP Model Learning Program, we would like to highlight a significant advantage of some embodiments of the present invention. As experimentally verified in Section "Delay and nonlinear effects", the evolution of $\theta$ is characterized by a significant delay with respect to the dynamics of $\alpha$. As a consequence, positions, velocities, and accelerations at time instant k are not sufficient to describe the FP dynamics. However, defining the state as the collection of past measured positions. In this case, the object state data represent a set of sequential measurement data of positions of the object in a predetermined period of time, and the manipulator state data represent a set of sequential measurement data of positions of the manipulator in a predetermined period of time. For setting properly $k_p$, we provide to the GPR a sufficiently informative input vector, letting the GPR algorithm select inputs at the proper time instants, thus inferring the system delay from data. Notice that when considering also velocities and accelerations, a similar approach would require a state of dimension $6k_p+1$, which is higher than what we propose in some embodiments of the present invention that is of $2k_p+1$.

Prediction Performance

In this section, we test the accuracy of different Model Learning programs to learn the evolution of the pendulum arm. The Model learning programs we consider for comparison purposes are:

$f_{der}(x_k, \dot{x}_k, \ddot{x}_k)$: a nonparametric Model Learning program defined by a RBF kernel with diagonal covariance and input given by $x_k$ and its derivatives, i.e. all the positions velocities and accelerations from time k to k-$k_p$, $k_p$=15;

$f_{NP}(x_k)$: a NPDF Model Learning program with a RBF kernel and with $k_p$=15;

$f_{PI}(x_k)$: the PIDF Model Learning program defined in (13) with $k_p$=15;

$f_{SP}(x_k)$: the SPDF Model Learning program defined in (14) with $k_p$=15.

The $f_{der}$ model is considered to provide the performance of a standard NP estimator based on $x^\alpha$ and $x^\theta$ derivatives.

Figure 7A:
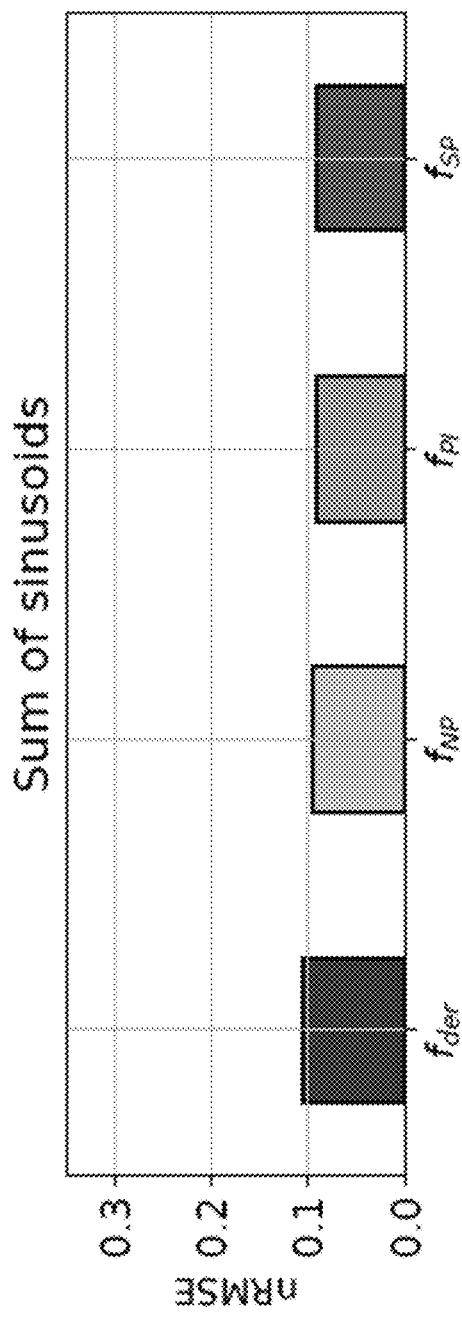
FIG. 7A shows the comparison of the performance of different model learning programs including some obtained with some embodiments of the present invention in terms of nRMSE obtained on test data recorded on an initial policy composed by sum of sinusoids.
Figure 7B:
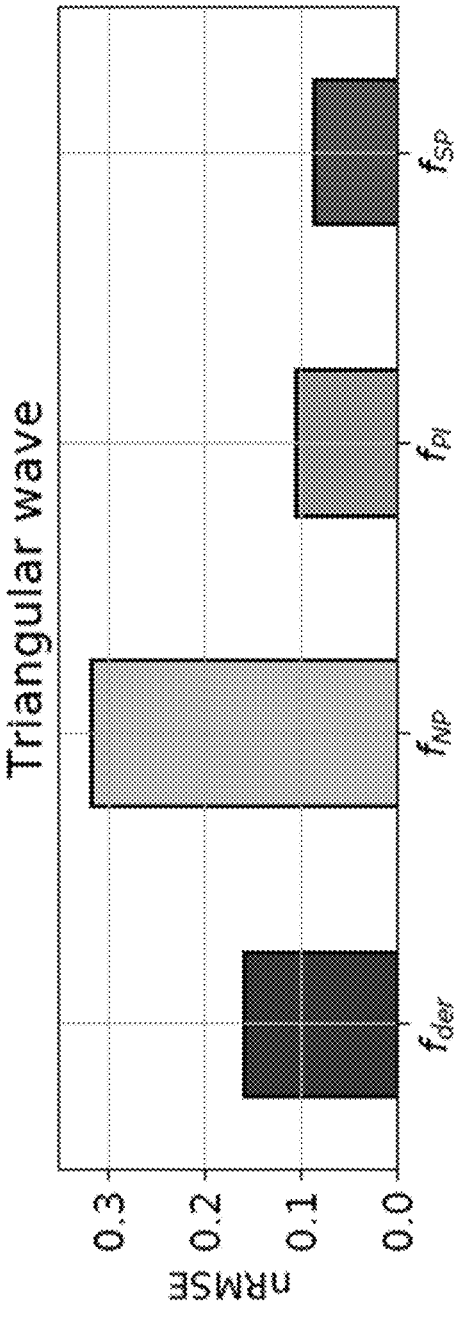
FIG. 7B shows the comparison of the performance of different model learning programs including some obtained with some embodiments of the present invention in terms of nRMSE obtained on test data recorded on an initial policy composed by triangular waves.

The Model Learning programs have been trained by minimizing the negative marginal log-likelihood (NIVILL) over a training data set $D_{tr}$ collected for 5 minutes at 140 Hz, the data collected. In this case, the object state data represent a set of sequential measurement data of positions of the object in a predetermined period of time. $D_{tr}$ is a collection of five trajectories, obtained by applying as input signal a sum of 30 sinusoids with random angular velocity ranging between=±10[radlsec]. Given the consistent dimension of the data set, we applied stochastic gradient descent in the NMLL minimization. We tested the estimators on two different data sets. The first test data set $D_{sin}$ is a trajectory of the same type as the ones in $D_{tr}$, while the second data set, denoted by $D_{trw}$, consists of trajectories obtained by applying as input a triangular wave. The latter data set is more challenging to predict, because the data are generated from a different distribution w.r.t. the training data. The performance in prediction of the proposed methods are reported in FIGS. 7A and 7B. FIGS. 7A and 7B show the bar-plots with nRMSE in the test data set of $f_{der}$, $f_{NP}$, $f_{PI}$ and $f_{SP}$.

In $D_{sin}$, all the estimators exhibit comparable high performance. Notice that $\Sigma_{der}$ and $f_{NP}$, which adopt the same kernel structure but different inputs, achieve the same performance, confirming that the information of velocities and accelerations are intrinsically contained in the history of the positions and some embodiments of the present invention can infer them automatically.

The performance on $D_{trw}$ confirm that the PI contribution is crucial to achieve good generalization properties. Indeed, $f_{der}$ and $f_{NP}$ performance significantly deteriorate when tested in input locations that are distant from the ones in $D_{tr}$. This is particularly pronounced in $f_{NP}$. Instead, the PI component in $f_{PI}$ and $f_{SP}$, through the use of proper basis functions defined in (13), captures the fundamental behavior of the FP dynamics, and exhibits good performance also on more challenging tests. Moreover, FIGS. 7A and 7B suggest that the adoption of the Cholesky parameterization on $\Sigma_{RBF}$ leads to an increase in the generalization ability of the NP contributions. Indeed, while the diagonal covariance in $f_{NP}$ is not able to fit the data in $D_{trw}$, the NP component of $f_{SP}$ defined under (14) improves the $f_{PI}$ predictions, allowing to maintain constant performance over the two test data sets. The predictor $f_{SP}$, which is the DF-SPGP Model learning program, outperforms all the other methods which confirms the advantages of some embodiments of the present invention.

Rollout Performance

Figure 8:
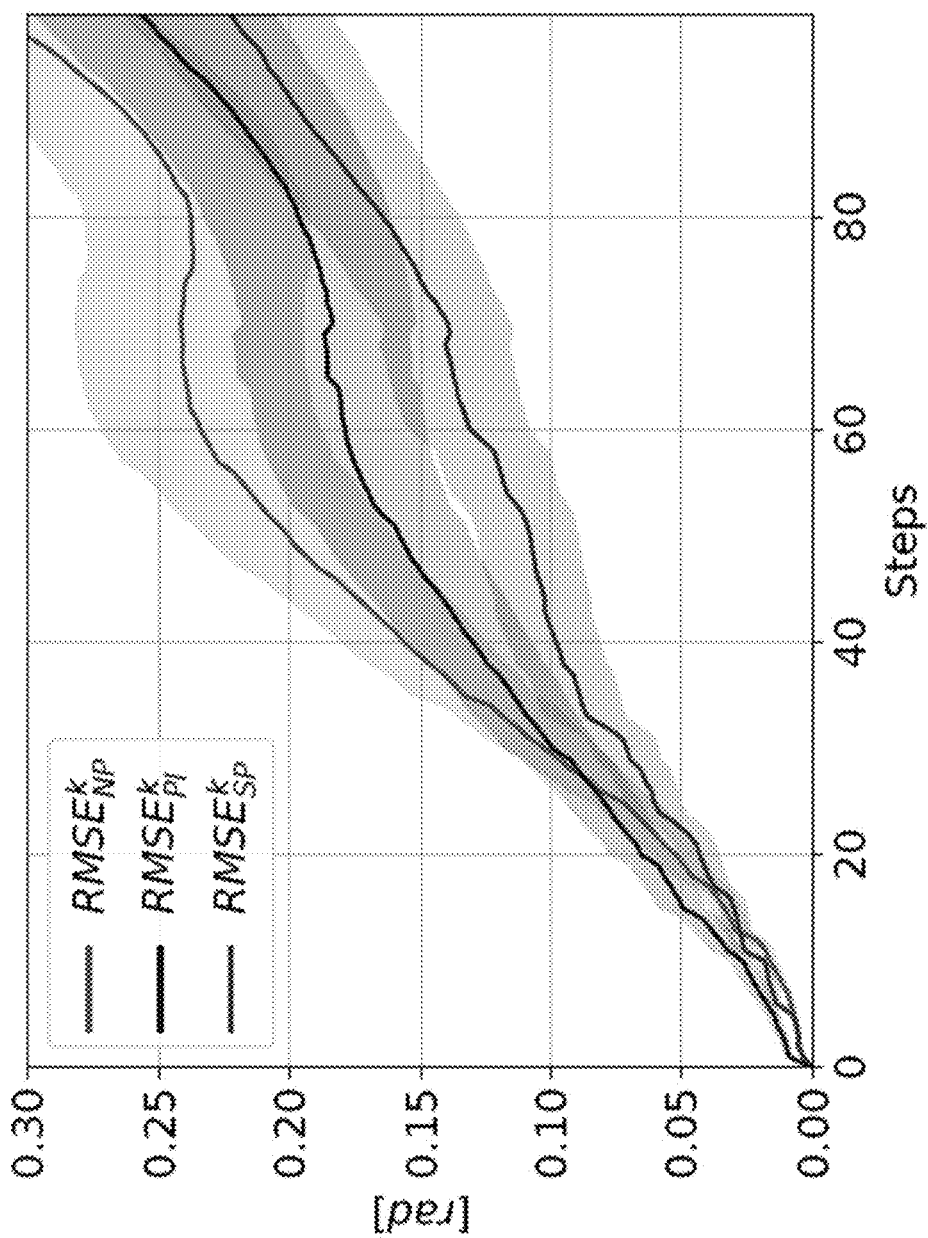
FIG. 8 compares in rollout several model learning programs including some obtained with some embodiments of the present invention in terms of $RAISE^k$ and its relative confidence intervals in rollout.

In this section, we characterize the rollout accuracy of the derived models, namely the estimation performance at n-steps ahead predictions. For each model, we performed $N_{sim}$ rollout. Considering the i-th rollout, we randomly pick an initial instant $k_i$, the input location $x_{k_i}$ in $D_{sin}$ is selected as initial input, and a prediction is performed for a window of $N_w$ steps. For each simulation, $e^i=[e_1^i, \ldots, e_{N_w}^i] \in R^{N_w}$ is computed by subtracting the predicted trajectory from the one realized in $D_{sin}$. To characterize how uncertainty evolves over time, we define the error statistic $RMSE_k = \sqrt{\Sigma_{i=1}^{N_{sin}}(e_k^i)^2 \backslash N_{sin}}$, that is the RAISE of the prediction at the k-th step ahead. The $RMSE_k$ confidence intervals are computed assuming i.i.d. and normally distributed errors. Under this assumptions, each $RMSE_k$ has a $x^2$ distribution. The performance in terms of the $RMSE_k$ of $f_{NP}$, $f_{PI}$ and $f_{SP}$ is reported in FIG. 8.

In the initial phase, $RMSE_{f_{Np}}^k$ is lower than $RMSE_{f_{PI}}^k$, whereas for k;30 $RMSE_{f_{NP}}^k$ becomes greater than $RMSE_{f_{PI}}^k$. This suggests that the NP model behaves well for short interval prediction, whereas the PI model is more suitable for long-terms predictions. The SP approach, which is the DF-SPGP Model learning program, looks particularly convenient, since it combines the advantages of these two models. The evolution of $RMSE_{f_{SP}}^k$ confirms this, $f_{SP}$ outperforms $f_{NP}$ and $f_{PI}$.

Control

The semi-parametric model in Eq.(14) is used to design a controller to swing-up the FP using the iLQG algorithm described earlier, which is updated-policy. In this case, the update-policy program is transmitted to the manipulating system after the update-policy program having been updated according to the updated DF-SPGP Model learning program. The trajectories obtained by the iLQG algorithm were simply implemented in an open-loop fashion on the real system to show the accuracy of the DF-SPGP Model learning program.

Figure 9A:
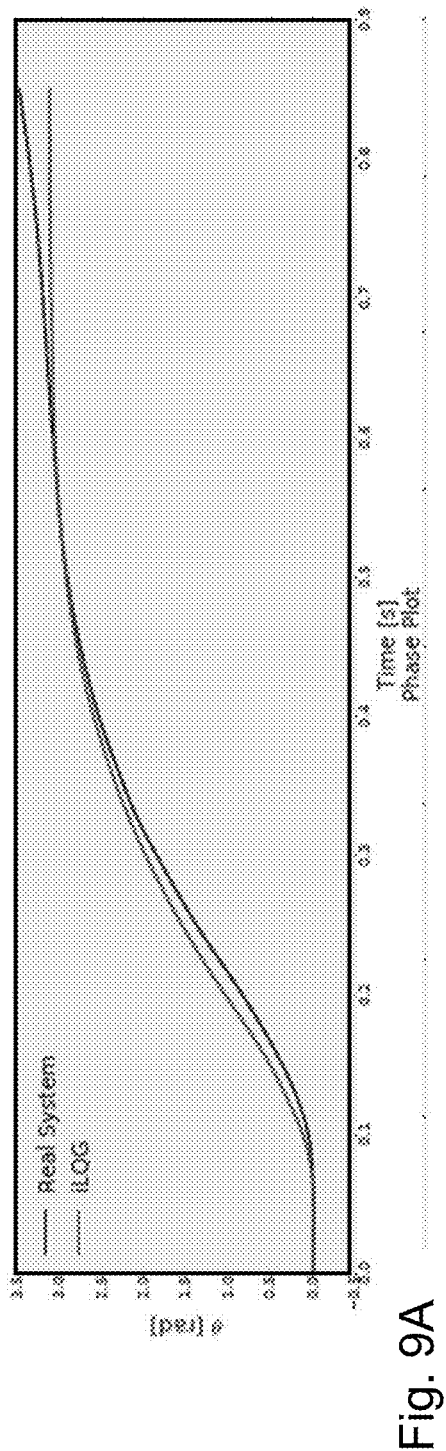
FIGS. 9A and 9B show performance of the iLQG trajectory on the Furuta Pendulum swing-up control, according to embodiments of the present invention.
Figure 9B:
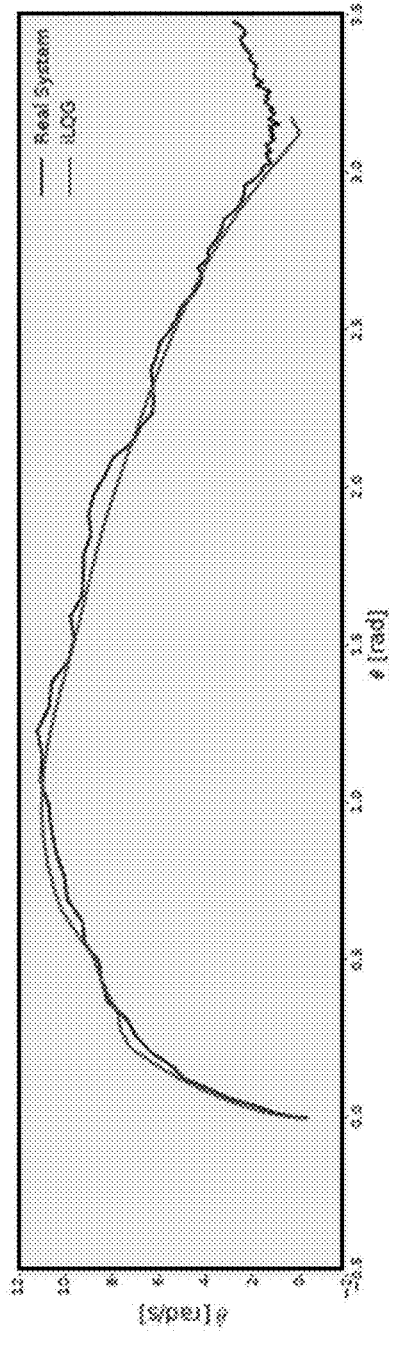

FIGS. 9A and 9B show the performance of the iLQG trajectory on the FP swing-up control. The FP is able to swing up with near-zero velocity to the goal position. In the figures, we report a good agreement between the θ trajectories obtained under the iLQG control sequence, using both the SP model as well as the real robot. The comparison shows the long-horizon predictive accuracy of the learned model. Notice that the models might lose accuracy around the unstable equilibrium point, because of lack of data which are harder to collect in this area during training. It could be pointed out that previous attempts to use GP-based MBRL were not able to swing-up a simpler class of inverted pendulum (cart-pole system), as the learned models were not accurate for long-term prediction. This shows the advantages of some embodiments of the present invention.

In the present disclosure, we presented a derivative-free learning framework for model based RL, and we defined a novel physically-inspired derivative-free kernel. Experiments with two real robotic systems, that are examples of the manipulator systems, show that the proposed DF-SPGP Model learning program outperforms in prediction accuracy its corresponding derivative-based GPR model, and that it is accurate enough to solve model-based RL control problems in real-world applications.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A manipulator learning-control apparatus for controlling a manipulating system, comprising:
    an interface configured to receive manipulator state signals of the manipulating system and object state signals with respect to an object to be manipulated by the manipulating system in a workspace, wherein the object state signals are detected by at least one object detector;
    an output interface configured to transmit initial and updated policy programs to the manipulating system;
    a memory to store computer-executable programs including a data preprocess program, object state history data, manipulator state history data, a Derivative-Free Semi-parametric Gaussian Process (DF-SPGP) kernel learning program, a Derivative-Free Semi-parametric Gaussian Process (DF-SPGP) Model learning program, an update-policy program and an initial policy program; and
    a processor, in connection with the memory, configured to transmit the initial policy program to the manipulating system for initiating a learning process that operates the manipulator system manipulating the object while a preset period of time, wherein the processor updates the DF-SPGP Model learning program according to the object state history data and the manipulator state history data converted, using the data preprocess program, from sets of the manipulator state and object state signals having received in the preset period of time, wherein the processor updates the update-policy program according to the updated DF-SPGP Model learning program.

2. The manipulator learning-control apparatus of claim 1, wherein the update-policy program is transmitted to the manipulating system after the update-policy program having been updated according to the updated DF-SPGP Model learning program.

3. The manipulator learning-control apparatus of claim 1, wherein the manipulator state signals are detected by state-detectors, wherein the state-detectors are arranged at moving portions of the manipulating system or at non-moving portions, or arranged at both the moving portions and the non-moving portions of the manipulating system.

4. The manipulator learning-control apparatus of claim 3, wherein the manipulator state signals are signals from actuators of the manipulating system, or encoders of the manipulating system, or combination of the signals from the actuators and the encoders.

5. The manipulator learning-control apparatus of claim 3, wherein the state-detectors are positioning sensors or encoders, or combination of the positioning sensors and the encoders.

6. The manipulator learning-control apparatus of claim 1, wherein the at least one object detector is an RGB or an RGBD camera generating the object state signals.

7. The manipulator learning-control apparatus of claim 1, wherein the object state data represent a set of sequential measurement data of positions of the object in a predetermined period of time.

8. The manipulator learning-control apparatus of claim 1, wherein the at least one object detector is separated from the manipulating system.

9. The manipulator learning-control apparatus of claim 1, wherein the state-detectors of the manipulator are arranged at joint positions of the manipulating system.

10. The manipulator learning-control apparatus of claim 3, wherein the manipulator state data represent a set of sequential measurement data of positions of the manipulator in a predetermined period of time.

11. The manipulator learning-control apparatus of claim 1, wherein the DF-SPGP Model learning program predicts behaviors of the manipulator and/or the object manipulated by the manipulator.

12. The manipulator learning-control apparatus of claim 7, wherein the DF-SPGP kernel learning program defines the DF-SPGP Model learning program which predicts behaviors of the manipulator and/or of the object manipulated by the manipulator.

13. The manipulator learning-control apparatus of claim 1, wherein the at least one object detector is a positional encoder generating the object state signals.

14. A computer-implemented manipulator learning method, comprising steps of
operating a manipulating system according to an initial policy program for a preset time period, wherein the initial policy program initiates a learning process that operates the manipulator system for manipulating the object;
receiving manipulator state signals and object state signals for the preset time period;
updating a DF-SPGP Model learning program according to object state history data and manipulator state history data converted from sets of the manipulator state and object state signals having received in the preset period of time; and
updates an update-policy program according to the updated DF-SPGP Model n learning program.

15. The manipulator learning method of claim 14, further comprises transmitting the updated update-policy program to the manipulating system.

16. The manipulator learning method of claim 14, wherein the manipulator state signals are detected by state-detectors arranged at moving portions of the manipulating system.

17. The manipulator learning method of claim 16, wherein the manipulator state signals are signals from actuators of the manipulating system, encoders of the manipulating system, or combination of the signals from the actuators and the encoders.

18. The manipulator learning method of claim 16, wherein the state-detectors are positioning sensors, encoders, or combination of the positioning sensors and the encoders.

19. The manipulator learning method of claim 14, wherein the at least one object detector is a RGB or a RGBD camera generating the object state signals.

20. The manipulator learning method of claim 14, wherein the object state data represent a set of sequential measurement data of positions of the object in a predetermined period of time.

21. The manipulator learning method of claim 14, wherein the at least one object detector is separated from the manipulating system.

22. The manipulator learning method of claim 14, wherein the state-detectors are arranged at joint positions of the manipulating system.

* * * * *